(12) United States Patent
Weber et al.

(10) Patent No.: US 6,577,029 B1
(45) Date of Patent: Jun. 10, 2003

(54) ELECTRIC MOTOR-DRIVEN MECHANISM

(75) Inventors: Matthias Weber, Baden-Baden (DE); Norbert Knab, Appenweier (DE); Roland Schmid, Stuttgart (DE); Piotr Deptula, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,117

(22) PCT Filed: Dec. 14, 1998

(86) PCT No.: PCT/DE98/03665
§ 371 (c)(1),
(2), (4) Date: Nov. 27, 2000

(87) PCT Pub. No.: WO99/53598
PCT Pub. Date: Oct. 21, 1999

(30) Foreign Application Priority Data

Apr. 8, 1998 (DE) .......................... 198 15 702

(51) Int. Cl.[7] ............................................. H02K 11/00
(52) U.S. Cl. ...................... 310/68 R; 310/68 B; 310/71
(58) Field of Search ............................. 310/68 R, 68 B, 310/67 R, 71, 75 R, 98, 239, 99

(56) References Cited

U.S. PATENT DOCUMENTS

| 5,063,317 A | * | 11/1991 | Bruhn ........................ 310/91 |
| 5,140,207 A | * | 8/1992 | Baumeister et al. .......... 310/83 |
| 5,245,258 A | | 9/1993 | Schelhorn et al. .......... 318/266 |
| 5,309,053 A | * | 5/1994 | Ade ............................. 310/71 |
| 5,331,257 A | * | 7/1994 | Materne et al. ............... 318/85 |
| 5,453,649 A | * | 9/1995 | Blanchet ...................... 310/71 |
| 5,528,093 A | * | 6/1996 | Adam et al. .................. 310/89 |
| 6,043,576 A | * | 3/2000 | Weber et al. ............. 310/68 B |

FOREIGN PATENT DOCUMENTS

| DE | 43 37 390 A | 4/1995 |
| DE | 197 10 015 A | 9/1998 |
| EP | 0 359 853 A | 3/1990 |
| EP | 0 489 940 A | 6/1992 |
| FR | 2 696 595 A | 4/1994 |
| GB | 2 289 351 A | 11/1995 |
| WO | 98 10971 A | 3/1998 |

* cited by examiner

Primary Examiner—Thanh Lam
(74) Attorney, Agent, or Firm—Michael J. Striker

(57) ABSTRACT

An electric-motor drive mechanism is proposed, with an electric motor (12) that has a brush holder (16, 116, 216) for containing brushes (15a, 15b) and at least one magnetic field sensor (18a, 18b, 118a, 218a) for detecting the magnetic field of a magnetic wheel (19) non-rotatably connected to the motor armature shaft (32) and an electronics housing (20) for containing an electronics mounting plate (24) for a set of motor output and/or control electronics. The electronics mounting plate (24, 124, 224) is disposed outside an electric motor pole pot housing (26) on a support (28, 128, 228) formed onto the brush holder (16, 116, 216) and that the at least one magnetic field sensor (18a, 18b, 118, 218) directly contacts the control electronics on the electronics mounting plate (24, 124, 224) by means of first inserted strip conductors (30a-1 ... 30a-3, 30b-1 ... 30b-3, 130, 230) that are guided in bundles and are at least partially integrated into the brush holder (16, 116, 216).

17 Claims, 4 Drawing Sheets

ELECTRIC MOTOR-DRIVEN MECHANISM

Figure 1:
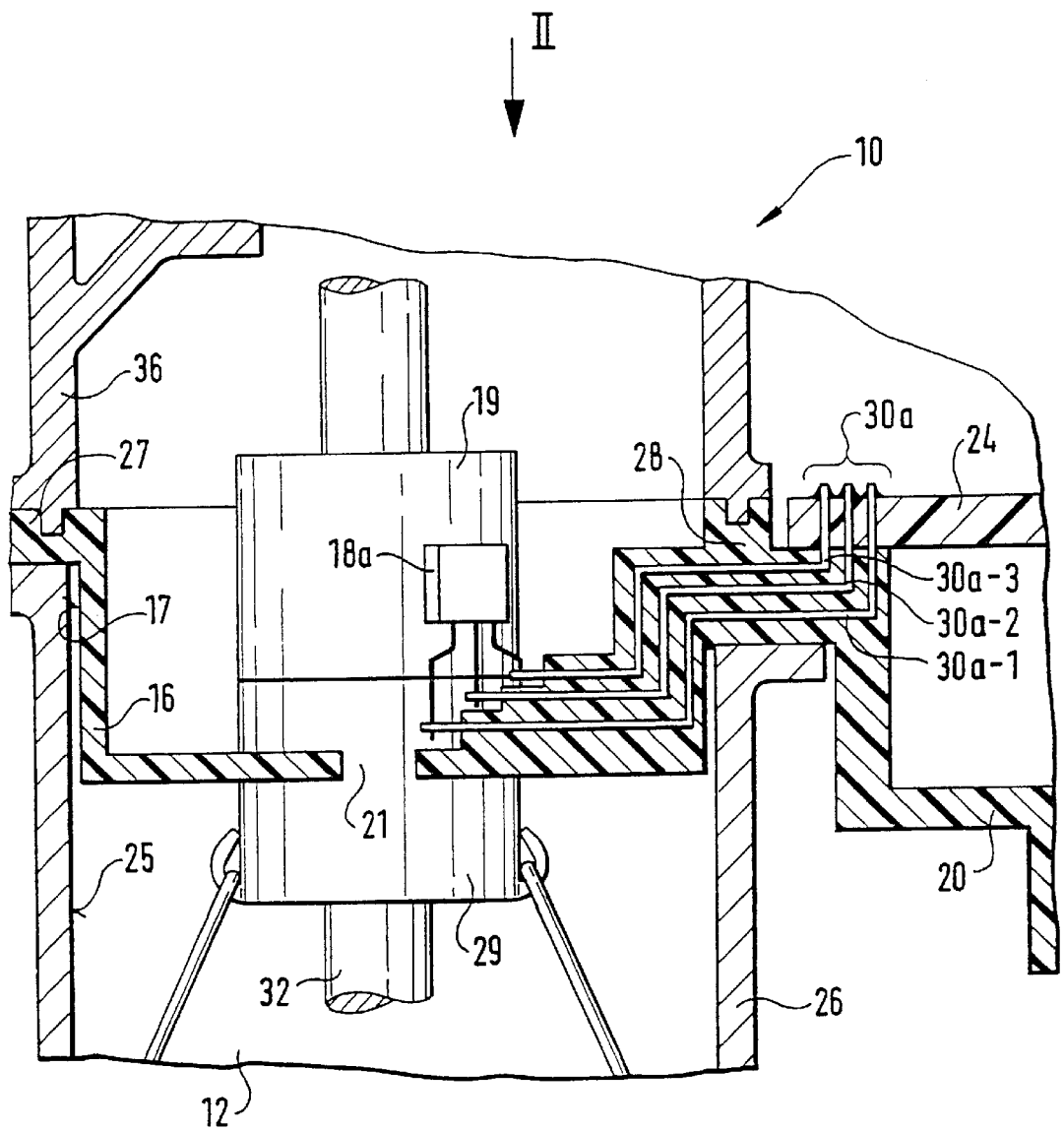

The invention relates to an electric-motor drive mechanism according to the preamble to the main claim.

The reference DE 43 37 390 C2 has disclosed an electric-motor drive mechanism with an electronic module which has a circuit for supplying power to the electric motor of the drive mechanism. The brush guide of a commutation device of the electric motor is connected to a supporting component of the electronic module constituted by an electric chassis. The supply of power to the brushes of the commutation device takes place by means of strip conductors, which are not a component of a printed circuit board of the electronic module.

Furthermore, electric-motor drive mechanisms with brush holders have been disclosed, which has a plug housing with connector plugs formed onto it. The brush holders are disposed inside the electric motor of the drive mechanism. Printed circuit boards with Hall sensors are disposed on the brush holders and are supplied with energy via inserted strip conductors that electrically contact the connector plugs.

This apparatus has the disadvantage that the attachment of printed circuit boards to the commutator is costly from a technical manufacturing standpoint and the printed circuit boards can only be replaced with difficulty in the event of the defect. Furthermore, the electronic components on the printed circuit board are subjected to the rough environmental conditions inside the motor. On the one hand, the temperature inside the motor is increased, on the other hand abrasion of the carbon brushes, the armature shaft bearing, or the armature shaft itself produced by the motor operation can come to bear on the electronic components and can trigger malfunctions and short-circuits.

ADVANTAGES OF THE INVENTION

The invention, with the features of the main claim, has the advantage that a set of motor control and output electronics, with the exception of one or several magnetic field sensors, is disposed completely outside the electric motor. Since the magnetic field sensors are not disposed on the electronics mounting plate as in the previously disclosed embodiments, the tolerances that must be maintained in the installation of the electronics mounting plate are less critical than in the previously disclosed embodiments. Furthermore, a modular design is possible since different control electronics can be provided for the same motor on different electronics mounting plates without changing the motor concept and a new set of electronics can be installed by replacing the electronics mounting plate. If the electronics mounting plate is disposed outside the motor compartment, it is considerably better protected against the abrasion of the electric motor. In particular, Hall sensors or magnetoresistive sensors are used as the magnetic field sensors.

The term inserted strip conductors is understood to mean that these strip conductors are not components of a printed circuit board. Instead, they are used to produce the contact between a printed circuit board and an electronic component that is spaced apart from it. They are comprised, for example, of metal strips which can constitute separate components or can be applied to other components of the electric motor.

Advantageous improvements and updates of the invention ensue from the dependent claims.

The electric-motor drive mechanism according to the invention can be produced in a particularly inexpensive manner if the electronics mounting plate has an essentially rectangular outline. In this case, standard printed circuit boards can be used. It is no longer necessary to expensively design the outline of the printed circuit boards based on the contour of the pole pot housing. Smaller deviations from the rectangular form can be simply and inexpensively manufactured.

In a favorable embodiment, the electronics mounting plate is disposed lateral to the rotation axis of the motor armature shaft. This disposition is particularly space-saving since the electronics housing can then turn out to be small.

The pole pot housing of electric motor is advantageously sealed in relation to the electronics mounting plate. As a result of this measure, the electronics mounting plate is even better protected against the abrasion of the electric motor. Also, moisture and other substances are effectively prevented from penetrating into the electric motor.

If the support tapers at the transition to the brush holder and the inserted strip conductor(s) are integrated into the taper, then they are guided from the pole pot housing to the electronic mounting plate so that they are protected in relation to the outside without additional measures. In addition to the mechanical protection, the accommodation in the brush holder/support, also effectively protects them electrically. By means of the taper between the support and the brush holder, the support can move the electronics mounting plate elastically out of the way within certain limits when there are forces engaging the outside of the electronics housing, as a result of which the danger of breakage is reduced.

In one embodiment of the invention, two magnetic field sensors are provided and the brush holder and the support have an at least approximate reflective axis lateral to the axis of the motor armature shaft in the plane of the electronics mounting plate. The magnetic field sensors are disposed in the circumference direction in relation to the magnetic wheel at approximately equal angles in relation to the center point of the magnetic wheel and the reflective axis. The use of two speed sensors permits the determination of the rotation direction through evaluation of the phase shift of the sensor signals. On the whole, this embodiment has the advantage that the inserted strip conductors can be disposed in a particularly space-saving manner.

The space-saving disposition can be further improved if the at least one magnetic field sensor is disposed tangential to the edge of a recess of the brush holder for containing the magnetic wheel, the inserted strip conductors have contact ends to the magnetic field sensor that are disposed oriented toward the brush holder, and contact strips of the inserted strip conductors are guided between the contact ends and the electronics mounting plate from the edge of the recess to the edge of the brush holder and from the edge of the brush holder onward, extend essentially parallel to the contour of the brush holder or the support and parallel to the plane of the electronics mounting plate. By means of this special guidance of the inserted strip conductors, moreover, the mechanical stability of the brush holder/support is improved and the breakage susceptibility is reduced since the strip conductors constitute a skeleton-like support structure inside the brush holder and the support. As a result of their parallel routing, the electrical signals transmitted from them are less susceptible to incoming interference signals.

Another advantageous improvement is achieved if second inserted strip conductors for supplying power to the brushes are at least partially integrated into the brush holder and are disposed between the support and the brush holder. In this instance, separate electrical routings from the electronics housing into the motor are no longer necessary since all of the contact strips to the motor extend inside the brush holder or the support.

Further advantageous improvements and updates of the invention ensue from the other dependent claims and in conjunction with the subsequent description.

DRAWINGS

Figure 2:
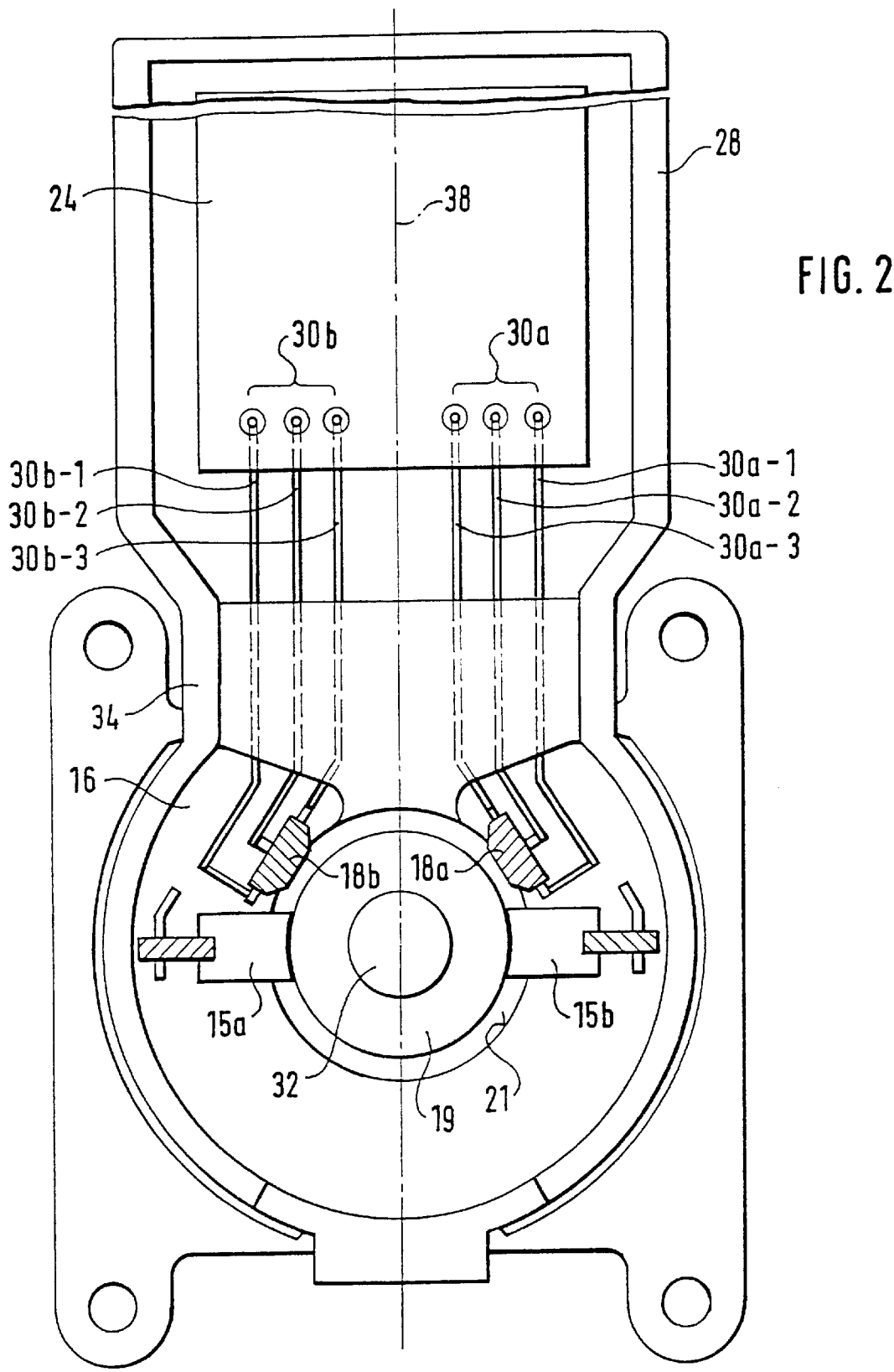
Figure 3:
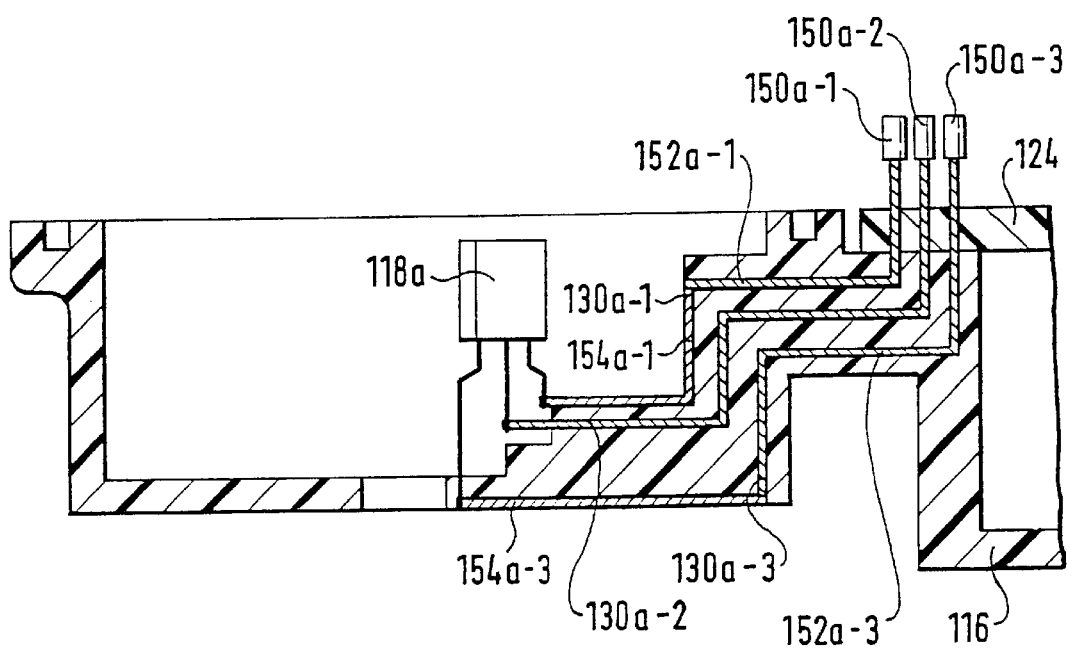
Figure 4:
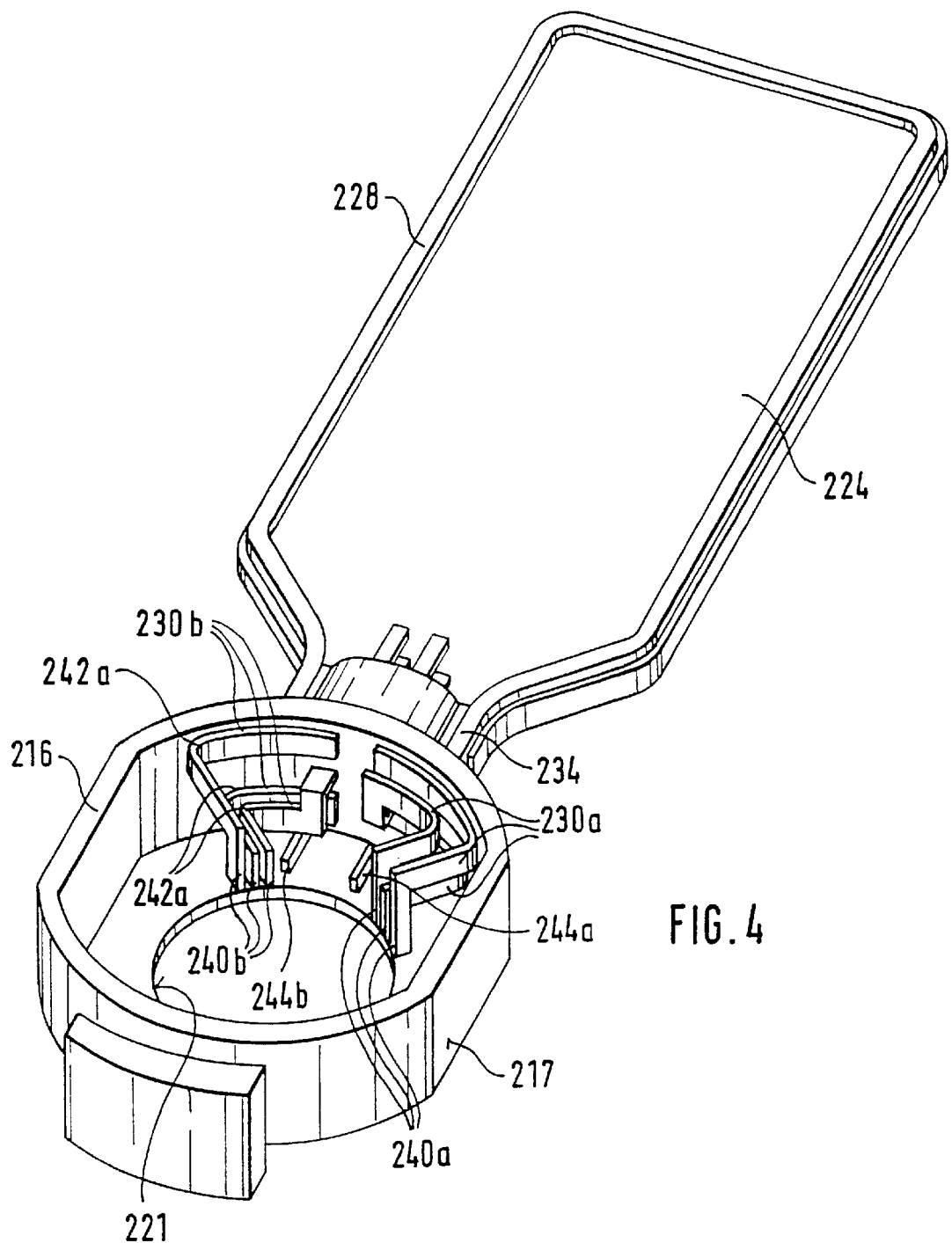

FIG. 1 shows a partially sectional detail of an electric-motor drive mechanism according to the invention, FIG. 2 is a view of the drive mechanism according to FIG. 1, in the direction II in FIG. 1, FIG. 3 shows a section through a second exemplary embodiment of the brush holder with a support injection molded onto it, which can be used in an electric-motor drive mechanism according to FIG. 1 as an alternative to the brush holder shown there, and FIG. 4 is a perspective representation of a third exemplary embodiment of a brush holder for an electric-motor drive mechanism according to the invention.

DESCRIPTION OF THE EXEMPLARY EMBODIMENTS

FIG. 1 shows an exemplary embodiment of the electric-motor drive mechanism according to the invention. An electric-motor drive mechanism 10 is comprised of an electric motor 12 and a transmission attached to it, which is not shown in detail. The electric motor 12 has a brush holder 16 for containing brushes 15a, 15b (FIG. 2) and two Hall sensors as magnetic field sensors 18a and 18b, which cooperate with a magnetic wheel 19 non-rotatably fastened to a motor armature shaft 32 in order to determine the rotation of the motor armature shaft 32 in relation to the stator of the electric motor 12 and values derived from this. The motor armature shaft 32 reaches through a recess 21 of the brush holder 16. The magnetic wheel 19 and a commutator 29, which is likewise disposed on the motor armature shaft 32 and is supplied with current for the electric motor 12 via the brushes 15a, 15b, can freely rotate in the recess 21. The outer contour 17 of the brush holder 16 is essentially inserted into the inner contour 25 of the pole pot housing 26. With the exception of the formed-on projection 27, which aids in the fixing of the brush holder 16 in the pole pot housing 26 and a likewise formed-on support 28, the brush holder 16 is accommodated completely inside the pole pot housing 26 or a transmission housing 36.

An electronics housing 20 for containing and protecting an electronics mounting plate 24 is disposed on the drive mechanism 10. The electronics mounting plate 24 is contacted with a plug connector in a plug part, not shown, that is formed onto the electronics housing 24 and supports a set of motor output and control electronics. Its outline is essentially rectangular in shape. The electronics mounting plate 24 is disposed lateral to the rotation axis of the motor armature shaft, i.e. with its planar normals parallel to the rotation axis, outside the pole pot housing 26 and is supported by a support 28 that is formed onto the brush holder 16 and whose outline is only slightly larger than that of the electronics mounting plate 24. By means of groups 30a and 30b each composed of three inserted strip conductors 30a-1 . . . 30a-3 and 30b-1 . . . 30b-3, both magnetic field sensors 18a and 18b are electrically connected to the control electronics on the electronics mounting plate 24. They are comprised of buckled and/or offset bent/stamped sheet metal parts and protrude from the support 28 or the brush holder 16 only at their ends for contacting and are otherwise completely injection molded into the brush holder 16 or the support 28.

In the transition region to the brush holder 16, the support 28 has a taper 34 (FIG. 2). Seals are disposed around the taper 34, which seal the support 28 with the electronics mounting plate 24 on one hand in relation to the transmission housing 36 and on the other hand in relation to the pole pot housing 26. The inserted strip conductors 30a-1 . . . 30a-3 and 30b-1 . . . 30b-3 are guided through the interior of the taper 34 as a passage region. The electronics mounting plate 24 itself is consequently completely sealed in relation to the pole pot housing 26.

The magnetic field sensors 18a and 18b are disposed at an angle of approximately 90° in the circumference direction in relation to the circular recess 21 and the magnetic wheel 19, which is disposed concentric to the recess 21 and axially symmetrical to an axis 38 of the brush holder 16. The axis 38 essentially constitutes a reflective axis of the brush holder 16 and of the support 28 and intersects with the rotation axis of the motor armature shaft 32. The two groups 30a and 30b of inserted strip conductors 30a-1 . . . 30b-3 are disposed at the same distance from the reflective axis 38 and their projections onto the plane of the electronics mounting plate 24 are virtually axially symmetrical to each other. All of the inserted strip conductors 30a-1 . . . 30b-3 in the exemplary embodiment extend essentially parallel to the plane of the drawing in FIG. 2, but are disposed partially offset to one another in the axial direction (perpendicular to the plane of the drawing of FIG. 2).

An alternative embodiment of the brush holder 116 for the drive mechanism 10 according to FIG. 1 is shown in FIG. 3. In this instance, the Hall sensor 118a is likewise contacted by inserted strip conductors 130a-1 . . . 130a-3. On their ends remote from the Hall sensor 118a, the inserted strip conductors 130a-1 . . . 130a-3 also have contacting means 150a-1 . . . 150a-3 for connection to plug connections which can be used, for example, to connect to a set of external electronics but are also simultaneously contacted by the electronics mounting plate 124. The inserted strip conductors 130a-1 and 130a-3 are each comprised of a stamped sheet metal part 152a-1 and 152a-3 as well as sections of conductive material 154a-1 and 154a-3 that are applied in an inlaid fashion into the surface of the plastic material of the brush holder 116. The application can be carried out, for example, using the MID technique. The sections 154a-1 and 154a-3 are inserted strip conductors in the sense that they are not a component of a printed circuit board, but are applied directly to the plastic brush holder 116 that is produced during the injection molding process.

A third embodiment of the brush holder 216 for an electric-motor drive mechanism according to the invention is shown in a perspective representation in FIG. 4. The inserted strip conductors 230a, 230b in this instance are one-piece stamped parts with contact ends 240a, 240 and contact strips 242a, 242 connected to them with an essentially rectangular cross section, which are injection molded into the brush holder 216. The axial offset of the inserted strip conductors on the support end is executed so that the inserted strip conductors 230a, 230a, and 230b, 230b are contacted by the top or the bottom of electronics mounting plate 224 depending on their axial position. By means of the contact ends 240a, 240b, these inserted strip conductors electrically contact the Hall sensors, which are preferably embodied as ICs. The contact strips 242a, 242b are placed in the brush holder 216 and in the support 228 so that they are routed from the magnetic field sensors to the edge of the brush holder 216 and extend from the edge essentially parallel to the outer contour 217 of the brush holder 216, parallel to the contour of the taper 234 in the transition region between the brush holder 216 and the support 228.

Furthermore, second inserted strip conductors 244*a* and 244*b* are integrated into the brush holder 216 and the support 228 which, on the support 228 side, are connected to the electronics mounting plate 224 and on the brush holder side 216, are connected to the brushes of the electric motor. The brushes are supplied with current via the second inserted strip conductors 244*a* and 244*b* They likewise extend in an axially symmetrical manner in relation to the reflective axis 238 and—at least on the side of the brush holder 216—are disposed in the center between the groups 230*a* and 230*b* of the first inserted strip conductors.

What is claimed is:

1. An electric-motor drive mechanism with an electric motor (12) that has a brush holder (16, 116, 216) for containing brushes and at least one magnetic field sensor (18*a*, 18*b*, 118, 218) for detecting the magnetic field of a magnetic wheel (19) non-rotatably connected to the motor armature shaft (32) and an electronics housing (20) for containing an electronics mounting plate (24, 124, 224) for a set of motor output and/or control electronics, wherein the electronics mounting plate (24) is disposed outside an electric motor pole pot housing (26) on a support (28, 128, 228) formed onto the brush holder (16, 116, 216), characterized in that the at least one magnetic field sensor (18*a*, 18*b*, 118, 218) directly contacts connection points of the control electronics on the electronics mounting plate (24, 124, 224) by means of first inserted strip conductors (30*a*-1 . . . 30*a*-3, 30*b*-1, 130, 230) that are guided in bundles and are at least partially integrated into the brush holder (16, 116, 216), wherein the first inserted strip conductors (30*a*-1 . . . 30*a*-3, 30*b*-1 . . . 30*b*-3, 130, 230) which respectively contact the same magnetic field sensors (18*a*, 18*b*, 118*a*, 218*a*) extend essentially parallel to one another, wherein the magnetic field sensors (218, 218*b*) are disposed tangentially to the edge of a recess (221) of the brush holder (216) in order to receive the magnetic wheel (19), that the first inserted strip conductors (230*a*, 230*a*, 230*b*, 230*b*) have contact ends (240*a*, 240, 240*b*, 240*b*) to the magnetic field sensor (128*a*, 218*b*) that are disposed oriented toward the brush holder, that contact strips (242*a*, 242*a*, 242*b*, 242*b*) of the first inserted strip conductors (230*a*, 230*a*, 230*b*, 230*b*) are guided between the contact ends (240*a*, 240, 240*b*, 240*b*) and the electronics mounting plate (224) from the edge of the recess (221) to the edge of the brush holder (216) and from the edge of the brush holder (216) onward, extend essentially parallel to the contour of the brush holder (216) or the support (228) and parallel to the plane of the electronics mounting plate (224).

2. The electric-motor drive mechanism according to claim 1, characterized in that the first inserted strip conductors (30*a*-1 . . . 230*a*-3, 30*b*-1 . . . 230*b*-3, 130, 230) in the brush holder (16, 116, 216) are disposed offset to the rotation axis of the motor armature shaft (32) and parallel to the plane of the brush holder (16, 116, 216) or of the support (28, 128, 228).

3. The electric-motor drive mechanism according to claim 2, characterized in that depending on their axial position on the side of the electronics mounting plate (224), the individual first inserted strip conductors (30*a*-1 . . . 30*a*-3, 30*b*-1 . . . 30*b*-3, 130, 230) are contacted by the top side or the bottom side of the electronics mounting plate (224).

4. An electric-motor drive mechanism with an electric motor (12) that has a brush holder (16, 116, 216) for containing brushes and at least one magnetic field sensor (13*a*, 18*b*, 118, 218) for detecting the magnetic field of a magnetic wheel (19) non-rotatably connected to the motor armature shaft (32) and an electronics housing (20) for containing an electronics mounting plate (24, 124, 224) for a set of motor output and/or control electronics, wherein the electronics mounting plate (24) is disposed outside an electric motor pole pot housing (26) on a support (28, 128, 228) formed onto the brush holder (16, 116, 216), characterized in that the at least one magnetic field sensor (18*a*, 18*b*, 118, 218) directly contacts connection points of the control electronics on the electronics mounting plate (24, 124, 224) by means of first inserted strip conductors (30*a*-1 . . . 30*a*-3, 30*b*-1, 130, 230) that are guided in bundles and are at least partially integrated into the brush holder (16, 116, 216), wherein the inserted strip conductors (30*a*-1 . . . 30*a*-3 . . . , 30*b*-1 . . . 30*b*-3, 130, 230) are sheet metal parts selected from the group consisting of buckled parts, offset bent parts and stamped parts and protrude from an element selected from the group consisting of the support (28, 128, 228) and the brush holder (16, 116, 216) only at their ends for contacting and are otherwise completely injection molded into the elements selected from the group consisting of the brush holder (16, 116, 216) and the support (28, 128, 228).

5. The electric-motor drive mechanism according to 4, characterized in that the electronics mounting plate (24, 124, 224) has an essentially rectangular outline.

6. The electric-motor drive mechanism according to claim 4, characterized in that the electronics mounting plate (24, 124, 224) is disposed lateral to the rotation axis of the motor armature shaft (32).

7. The electric-motor drive mechanism according to claim 4, characterized in that the pole pot housing (26) and/or the transmission housing (36) of the drive mechanism (10) are sealed in relation to the electronics mounting plate (24, 124, 224).

8. The electric-motor drive mechanism according to claim 4, characterized in that in the transition to the brush holder (16, 116, 216), the support (28, 128, 228) has a taper (34, 234) and that the first inserted strip conductors (30*a*-1 . . . 30*a*-3, 30*b*-1 . . . 30*b*-3, 130, 230) are integrated into the taper (34).

9. The electric-motor drive mechanism according to claim 8, characterized in that two magnetic field sensors (18*a*, 18*b*, 118, 218) are provided, that the brush holder (16, 116, 216) and the support (28, 128, 228) have an at least approximate reflective axis (38) lateral to the rotation axis of the motor armature shaft (32) in the plane of the electronics mounting plate (24, 124, 224), and that the magnetic field sensors (18*a*, 18*b*, 118, 218) are disposed in the circumference direction in relation to the magnetic wheel (19) at approximately equal angles in relation to the center point of the magnetic wheel and the reflective axis (38).

10. The electric-motor drive mechanism according to claim 9, characterized in that a group (30*a*, 30*b*, 130*a*, 130*b*, 230*a*, 230*b*) of first inserted strip conductors (30*a*-1 . . . 30*a*-3, 30*b*-1 . . . 30*b*-3, 130, 230) is guided to each of the two magnetic field sensors (18*a*, 18*b*, 118, 218), and that the groups (30*a*, 30*b*, 130*a*, 130*b*, 230*a*, 230*b*) are disposed virtually symmetrical to each other in their projections onto the plane of the electronics mounting plate (24, 124, 224) in relation to the reflective axis (38).

11. The electric-motor drive mechanism according to claim 4, characterized in that the first inserted strip conductors (30*a*-1 . . . 30*a*-3, 30*b*-1 . . . 30*b*-3, 130, 230) which are respectively contact the same magnetic field sensors (18*a*, 18*b*, 118*a*, 218*a*) extend essentially parallel to one another.

12. The electric-motor drive mechanism according to claim 4, characterized in that second inserted strip conductors (244a, 244b) for supplying power to the brushes are at least partially integrated into the brush holder (216) and are disposed between the support (228) and the brush holder (216).

13. The electric-motor drive mechanism according to claim 12, characterized in that the second inserted strip conductors (244a, 244b) for supplying power to the brushes are disposed in the center between the groups (230a, 230b) of first inserted strip conductors.

14. The electric-motor drive mechanism according to claim 4, characterized in that the brush holder (16, 116, 216) is comprised of plastic and the first inserted strip conductors (30a-1 . . . 30a-3, 30b-1 . . . 30b-3) are at least partially injection molded onto into the brush holder (16, 116, 216).

15. The electric-motor drive mechanism according to claim 4, characterized in that the first inserted strip conductor (130a-1 . . . 130a-3, 130b-1 . . . 130b-3) are at least partially comprised of sections (154a-1, 154a-3) of conductive material that is applied to the surface of the brush holder.

16. The electric-motor drive mechanism according to claim 4, characterized in that on their side remote from the at least one magnetic field sensors (118a), the first inserted strip conductors (130a-1 . . . 130a-3) have contacting means (150a-1 . . . 150a-3) for connecting to plug connections.

17. The electric-motor drive mechanism according to claim 4, characterized in that at least one of the magnetic field sensors (18a, 18b) is welded and/or soldered to the inserted strip conductors (30a-1 . . . 30a-3 or 30b-1 . . . 30b-3) that connect it to the control electronics.

* * * * *